Dec. 16, 1958     H. K. GILLMAN     2,864,304
AUTOMATIC CLAMPING MECHANISM FOR POSITIONING AND
HOLDING HAM SHANKS AND SIMILAR ARTICLES DURING
VASCULAR INJECTION THEREOF

Filed Aug. 1, 1957     2 Sheets-Sheet 1

INVENTOR:
HAROLD K. GILLMAN
BY
ATT'Y

Dec. 16, 1958     H. K. GILLMAN     2,864,304
AUTOMATIC CLAMPING MECHANISM FOR POSITIONING AND
HOLDING HAM SHANKS AND SIMILAR ARTICLES DURING
VASCULAR INJECTION THEREOF
Filed Aug. 1, 1957     2 Sheets-Sheet 2
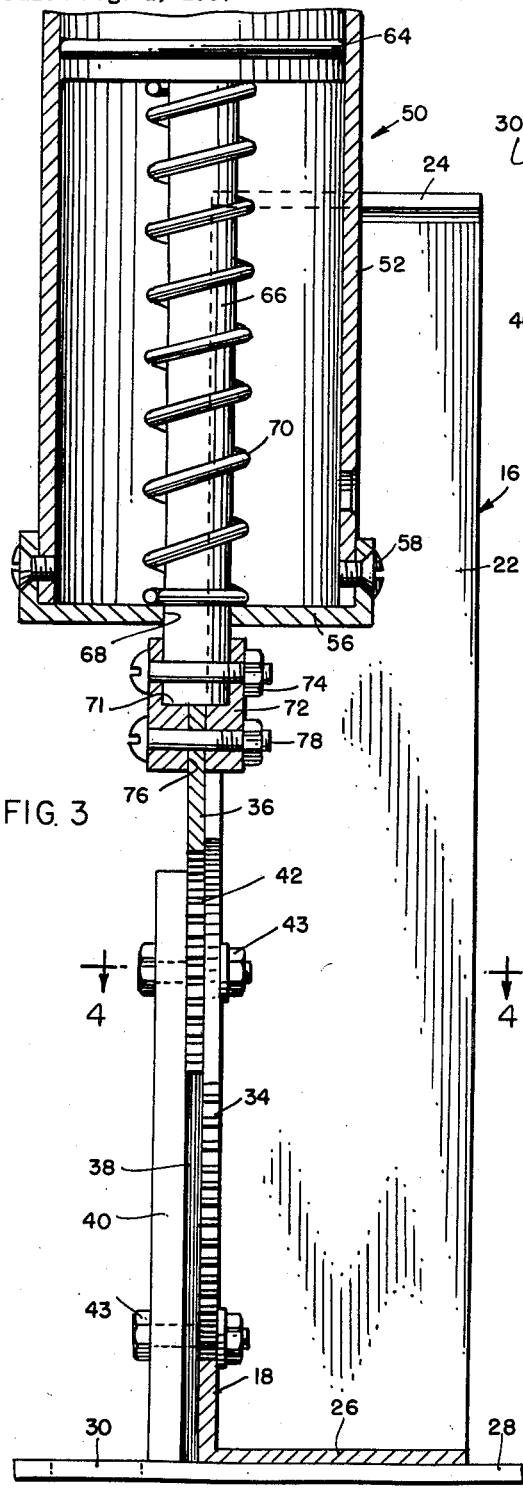
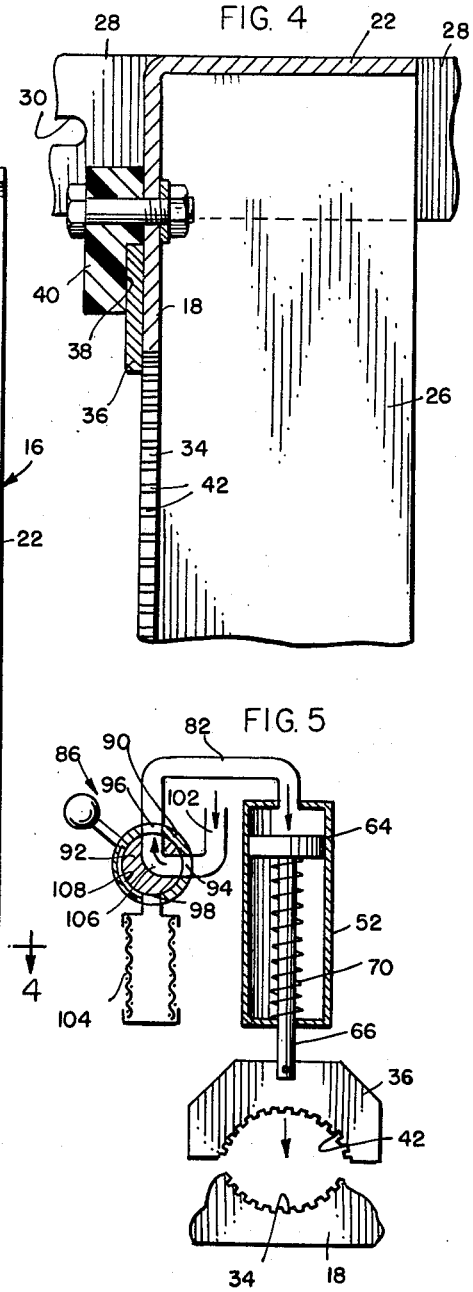
INVENTOR:
HAROLD K. GILLMAN
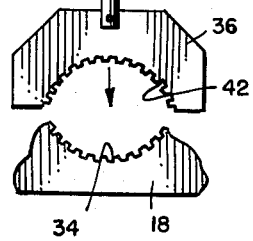
ATT'Y

United States Patent Office 2,864,304
Patented Dec. 16, 1958

2,864,304

AUTOMATIC CLAMPING MECHANISM FOR POSITIONING AND HOLDING HAM SHANKS AND SIMILAR ARTICLES DURING VASCULAR INJECTION THEREOF

Harold K. Gillman, Albany, N. Y., assignor, by mesne assignments, to The Allbright-Nell Co., Chicago, Ill.

Application August 1, 1957, Serial No. 675,756

2 Claims. (Cl. 100—269)

The automatic clamping mechanism comprising the present invention has been designed for use primarily as an arterial clamp for constricting the small end of a ham or similar comestible in order to close the veins or arteries at this end of the ham prior to injection of a pickling brine or other curing fluid into the vascular system of the product. The invention is however capable of other use and the present clamping mechanism may, if desired, with or without suitable modification, find utility in otherwise handling hams or similar comestibles, for example in skinning or depilatory processes. Irrespective however of the particular use to which the present clamping device may be put, the essential features thereof are at all times preserved.

In the curing of meat products, for example, hams, it is the practice to inject a curing fluid into the vascular system of the product under pressure. Due to the porosity of the vascular system, the fluid thus injected is caused to fill the veins and flow outwardly thereof by osmosis or other diffusion process into the flesh surrounding the arterial system. If the open ends of the veins or arteries comprising the vascular system of the particular product undergoing curing are not closed, it is obvious that the injected fluid will pass on through the product and insufficient pressure will be built up within the system to cause the necessary diffusion. Furthermore, the outward flow of the curing fluid from the severed veins represents a loss to the packer. Accordingly, it has heretofore been the practice to restrict the veins at one end of the product by passing a cord around the same and drawing the same taut, thus constricting the ends of the products and with it the arteries or veins associated with same. Such a procedure is not only time-consuming but in many instances it causes damage to the product due to the cutting action of the string or other cord employed in the tying process. Additionally, after the product has been cured, it is necessary to sever the cord for further preparation of the product for the market.

The present invention is designed to overcome the above noted difficulties that are attendant upon the practice of curing hams and other comestibles by injection of a curing fluid into the vascular system thereof, and toward this end it contemplates the provision of a novel form of pneumatically operated clamping mechanism by means of which the small end of a ham or the like may be effectively clamped so that the veins at this end of the product will be constricted against passage of fluid therethrough so that upon injection of a curing fluid into the vascular system, the necessary pressure of fluid will be built up therein to permit proper diffusion of the fluid throughout the body of the product.

Inasmuch as curing processes of the type briefly outlined above are controlled processes, which is to say that the quantity of curing fluid injected into the product bears a definite relation to the weight of the individual product, the injection operation is usually performed with the product resting on the weighing platform of a scale. In the case of a ham, the ham is first placed on the platform and the net weight is determined. The injection or hypodermic needles are attached to the ham in the proper positions and the scales are counterbalanced to correct for the weight of the needles and their associated attachments. The quantity of fluid to be injected is then ascertained and during pumping of this fluid into the ham, the scale pointer is watched so that when the proper increase of the ham has been attained, the flow of fluid through the injection needles may be arrested. The present invention is designed to accommodate this procedure and, toward this end, it contemplates the provision of a pneumatically operated clamping mechanism which may be suitably supported upon the weighing platform of the scale so that its weight may be compensated for by suitable counterbalancing means, while at the same time the mechanism includes a clamping platform on which the ham may be placed and its weight, together with the weight of the fluid which may be injected into the ham from time to time, ascertained as a part of the net weight of the apparatus by a reading of the scale pointer.

The provision of a clamping apparatus of the character briefly outlined above being among the principal objects of the invention, it is a further object to provide a clamping apparatus of this sort wherein the clamping instrumentalities per se are positioned adjacent one end of the ham supporting platform whereby, when the ham is positioned on the platform, these instrumentalities may move into and out of clamping engagement with the small end of the ham without requiring any individual adjustment or aligning procedures on the part of the operator.

Another object of the invention, in an apparatus of this sort, is to provide a clamping mechanism having associated therewith a pair of cooperating clamping jaws or elements which are movable into or out of clamping relationship with respect to the ham shank under influence of a pneumatically actuated cylinder, the cylinder in turn being controlled by manipulation of a single two-position control handle, the handle constituting the sole actuating device for the mechanism.

A further object of the invention is to provide a clamping device of this character which will accommodate hams and other similar products which vary widely in their size, weight and shape, without requiring any adjustment whatsoever on the part of the operator.

The provision of an apparatus which is extremely simple in its construction; one which is comprised of a minimum number of moving parts and which therefore is unlikely to get out of order; one which is rugged and durable and which therefore will withstand rough usage; one which is capable of being readily assembled and disassembled for purposes of inspection, replacement of parts and repair; one which is smooth and silent in its operation; one which is attractive in its appearance and pleasing in its design, and one which, otherwise, is well adapted to perform the services required of it, are further desiderata which have been borne in mind in the production and development of the present invention.

Numerous other objects and advantages of the invention, not at this time enumerated, will become more readily apparent as the nature of the invention is better understood.

In the accompanying two sheets of drawings forming a part of this specification, a preferred embodiment of the invention has been shown.

In these drawings:

Fig. 3 is an enlarged vertical sectional view taken substantially on the plane indicated by the lines 3—3 of Fig. 1 in the direction of the arrows;

Fig. 4 is a sectional view taken substantially along the line 4—4 of Fig. 3; and Fig. 5 is a sectional view, somewhat schematic in its representation, taken through the piston and control valve assembly by means of which the clamping instrumentalities of the present invention are actuated.

Figure 1:
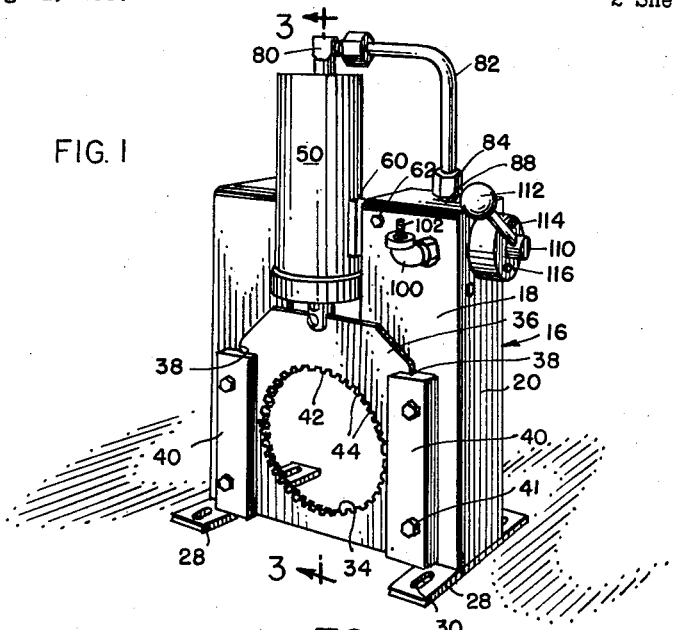
Fig. 1 is a front perspective view of a clamping apparatus constructed in accordance with the principles of the present invention.
Figure 2:
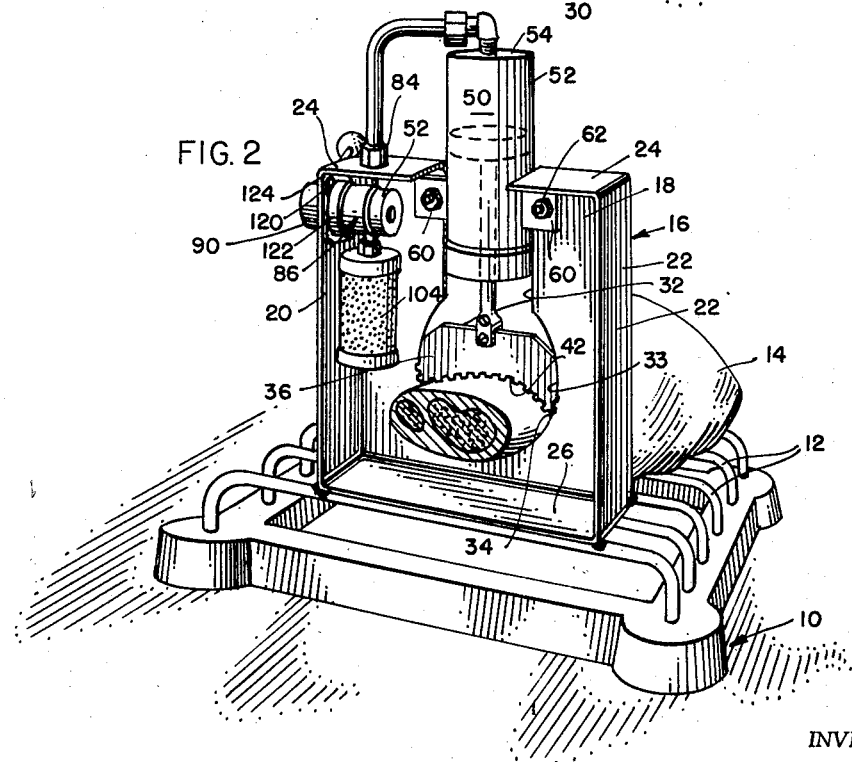
Fig. 2 is an enlarged rear perspective view of the clamping device.

Referring now to the drawings in detail and in particular to Figs. 1 and 2, the apparatus involves in its general organization a generally rectangular base 10 of open frame-like design, across which there extends a plurality of bars 12 which, collectively, provide a grid or receiver on which a comestible such as the ham shank designated at 14 is adapted to be received for clamping purposes. Supported on the grid in the rear region thereof is an open box-like structure designated in its entirety at 16, which structure constitutes the framework of the clamping mechanism assembly per se. The frame-work 16 includes a vertically extending front plate 18 from which there extends rearwardly a pair of side flanges or walls 20 and 22 and top and bottom flanges or walls 24 and 26, respectively. The rear side of the structure is open as best seen in Fig. 2. Welded or otherwise secured to the bottom wall 26 adjacent the opposite ends thereof are a pair of attachment feet 28 in the form of metal plates having slots 30 formed therein, by means of which the apparatus may be attached to a supporting surface, as for example by suitable anchoring bolts or screws (not shown). For attachment to the grid bars 12 the projecting portions of the feet 28 may be cut away and the same may be spot welded to the bars 12 as shown in Fig. 2.

Still referring to Figs. 1 and 2 the top wall 24 and vertical front wall 18 are cut away to provide a relatively deep slot which extends downwardly from the upper edge of the wall 18 to a region adjacent the bottom of the latter. The slot is defined by a pair of opposed vertical edges 32 which merge with a generally circular widened portion or opening 33 in the lower regions of the wall 18. The lower portion of the opening 33 throughout an extent of approximately 180° is toothed as at 34 and this toothed portion constitutes the lower stationary pillow edge or portion of a guillotine assembly having an upper movable clamping blade 36 slidable in guideways 38 provided in a pair of guide-blocks 40 bolted as at 41 to the wall 18 at laterally spaced regions thereon. The clamping blade 36 is formed with an arcuately relieved portion 42 which is toothed as at 44 throughout an arcuate extent of approximately 180° with the two toothed portions 34 and 44 being arranged in clamping opposition to each other whereby, upon descent of the clamping plate 36 toward the pillow edge of the guillotine device, the small end of the ham shank 14, which has previously been inserted into the guillotine opening, will be firmly engaged between the toothed edges 34 and 44 and thus constricted as will be described presently.

The movable clamping blade 36 is movable from the raised retracted position shown in Fig. 1 to the lowered clamping position shown in Fig. 2 under the influence of the pneumatically operated actuating cylinder assembly 50, the details of which are best illustrated in Fig. 3.

Referring now to Fig. 3, the cylinder assembly 50 includes a cylindrical cylinder proper or shell 52, the upper end of which is closed by means of a top wall 54 and the lower end of which is closed by means of a cap member 56 removably secured by screws 58 to the lower open rim of the cylinder shell 52. A pair of attachment ears 60 (Figs. 1 and 2) extend radially from the medial regions of the shell 52 and are secured by means of bolt assemblies 62 to the front wall 18 of the box-like framework. The cylinder assembly 50 is thus supported adjacent the upper end of the frame-work and is centered between the two opposed edges 32 which define the vertical slot in the front wall 18. Slidably disposed within the cylinder shell 52 is a piston 64 carried on a stem or plunger 66 which projects downwardly through an opening 68 provided in the cap member and by means of which opening it is guided in its reciprocating movements. A coil spring 70 surrounds the plunger 66 and bears at one end against the cap 56 and at its other end against the underneath side of the piston 64 whereby the latter is normally urged to its upper retracted position within the cylinder shell 52.

The lower end of the plunger 66 extends into a socket 71 provided in a cross-head 72 and is secured therein by means of a clamping bolt assembly 74. The lower end of the cross-head 72 is slotted as at 76 and receives therein the upper edge of the previously mentioned clamping blade 36, the latter being secured in position within the slot 76 by means of a clamping bolt assembly 78. The piston 64 and plunger 66 are movable in unison from an upper retracted position as shown in Figs. 1 and 3 wherein the clamping blade 36 assumes an elevated position within the guide-ways 38 to a lowered position as shown in Fig. 2 wherein the clamping blade 36 engages the small end of a ham shank 14 positioned on the grid bars 12 and firmly clamps this end of the ham to restrict the veins thereof as previously described. The guide-blocks or bars 40 are preferably formed of a suitable plastic material, as for example molded Teflon which has a minimum amount of frictional resistance to the metal of the clamping blade 36, so as to provide a sliding connection which requires no oiling or lubrication of any sort.

Means are provided for supplying air under pressure to the upper regions of the cylinder shell 52 to cause depression of the piston 64 and plunger 66 and, toward this end the cylinder top wall 54 is provided with a nipple fitting 80 operatively connected through a conduit 82 in the form of a length of tubing to a second nipple fitting 84 associated with a control valve assembly 86 (Figs. 2 and 5). The fitting 84 extends through a circular hole 88 provided in the top wall 24 and communicates with the valve 86 at a region within the box-like frame-work structure 16.

The valve assembly 86 is of conventional design and various types of valves may be found suitable for use in connection with the present invention, whether these valves be of the rotary core, sliding spool, displaceable diaphragm, or other types. The assembly 86 is however essentially a two-way valve and, for purposes of illustration herein, such a valve has schematically been shown in Fig. 5, while the mounting for the valve assembly is best seen in Fig. 2. The valve assembly 86 involves in its general organization an outer shell or casing 90, closed at its opposite ends and having rotatably mounted therein a valve core 92 of cylindrical design. The casing 90 is provided with an air inlet port 94, a discharge port 96, and an exhaust port 98. The inlet port 94 is connected by means of a fitting 100 (Fig. 1) with a supply conduit 102 leading to a source of air under pressure (not shown).

The discharge port 96 communicates through the fitting 84 with the conduit 82 leading from the upper end of the cylinder shell 52. The exhaust port 98 communicates with the atmosphere through a conventional muffler or silencer assembly 104. The valve 92 is formed with an L shaped passage 106 therein, capable in one position of the core 92 of establishing communication between the ports 94 and 96, and in another position of the core 92 of establishing communication between the port 96 and an arcuate circumferentially extending groove 108 provided in the inner face of the cylindrical casing 92. The groove 108 communicates with the port 96 so that when the valve core 92 is in such a position that the passage 106 registers with the port 96 and the groove 108, air may be forced from the cylinder shell 52 above the piston 64, through the conduit 82, port 96, passage 106, groove 108, port 98 and silencer device 104 to the atmosphere.

As best seen in Fig. 1, the valve core 92 is provided with a reduced end or extension 110 which projects outwardly through an end wall of the valve casing 90 and has mounted thereon an operating handle 112 by means of which the valve core 92 may be manipulated. The handle 112 is movable between a pair of limit stops 114 and 116 respectively, the two limit stops determining the two extreme operative positions of the valve core 92. When the handle 112 is in position against the limit stop 116 the core 92 will assume the position wherein it is shown in Fig. 5 so that air issuing from the conduit 102 may pass through the port 94, passage 106, port 96 and conduit 82 to the interior of the cylinder shell 52 thereby admitting air to the upper end of the shell to depress the piston 64 and plunger 66 and thus move the clamp blade 36 to its clamping position. When the handle 112 is in position against the limit stop 114, the valve core 92 will be at its other extreme position wherein the port 96 and groove 108 are in communication so that the air within the cylinder shell 52 may be exhausted to atmosphere under the influence of the spring 70 as previously described to elevate the clamping blade 36 and release the shank 14.

The valve assembly 86 is operatively mounted on the side wall 20 of the box-like frame-work 16 and, accordingly, the wall 20 is formed with a circular opening 120 through which the shell 52 extends and in which it is firmly anchored by means of a retaining sleeve 122 which may be press fitted on the shell 52 and secured by means of screws 124 to the wall 20. The silencer device 104 is suspended from and supported by the shell 52.

From the above description it is thought that the nature and many advantages of the herein described clamping mechanism will be understood without further description. It is to be noted however at this point that the rectangular frame-like platform 10, upon which the clamping mechanism is mounted as previously described, is capable of being positioned on the upper horizontal base of a weighing platform. In such an instance the operator will place the ham shank on the grid bars 12 with the small end of the shank projecting through the slot defined by the arcuate edges 33 of the front wall 18 and the net weight of the ham shank may be determined by a direct reading of the scale associated with the weighing platform. It will be understood of course that compensation will previously have been made for the weight of the clamping mechanism and its supporting frame-work 10 including the grid bars 12. The injection needles may then be attached to the ham shank at the desired locations and the scale loaded or counterbalanced to counteract for the weight of the needles or other attachments. The quantity of curing fluid which is desired to pump into the ham shank is then ascertained and prior to the injection operation the handle 112 will be manipulated to lower the clamping blade 36 and cause the small end of the ham to be constricted to prevent outward flow of the fluid from the arterial system of the product. Thereafter the curing fluid may be pumped into the product in the usual manner and the scale pointer noted from time to time so that the increase in weight of the product as the injection proceeds may be ascertained. When the scale pointer has indicated that the desired quantity of fluid has been pumped into the product, the operator will close the valve associated with the injection needle or needles. At the same time the handle 112 may be manipulated to cause the clamping blade 36 to remove to its elevated position wherein the small end of the ham shank is released.

A preferred embodiment of the invention has been shown in the accompanying drawings and described herein. It will be understood however that other embodiments are contemplated and that the invention is not to be limited to the exact arrangement of parts disclosed since various changes in the details of construction may be resorted to without departing from the spirit of the invention. Only insofar as the invention has particularly been pointed out in the accompanying claims is the same to be limited.

Having thus described the invention what I claim as new and desire to secure by Letters Patent is:

1. In an apparatus for clamping one end of a meat product to contract the veins thereof during hypodermic injection of a curing fluid into said veins, a horizontally disposed platform for supporting the product and adapted to be positioned on the weighing platform of a scale, a shallow box-like framework positioned on said supporting platform adjacent one end thereof and including a flat rectangular front wall disposed in a vertical plane and extending upwardly from the platform, and having vertical rearwardly extending marginal side flanges, and horizontal top and bottom rearwardly extending marginal flanges respectively, said top flange and said front wall being relieved to divide the top flange into two spaced sections and to provide a vertical slot in the front wall extending from the upper edge thereof to a region adjacent the bottom thereof, the lower edge of said slot being of arcuate configuration having an upwardly presented concavity, a pair of vertically disposed strips of anti-friction material secured to said front wall on opposite sides of the slot, respectively, and defining a pair of oppositely facing opposed guideways, a flat clamping blade slidable in said guideways and having an arcuate edge with a downwardly presented concavity disposed in opposition to said lower edge of the slot, said blade being movable between an elevated position wherein said edges are relatively remote from each other to a lowered position wherein said edges are in relatively close proximity for clamping an end of a meat product therebetween, and means for moving said movable clamping blade between its advanced position and its retracted positions.

2. In an apparatus for clamping one end of a meat product to contract the veins thereof during hypodermic injection of a curing fluid into said veins, the combination set forth in claim 1 wherein said arcuate surfaces are serrated to provide opposed sets of clamping teeth thereon.

References Cited in the file of this patent

UNITED STATES PATENTS

| | | |
|---|---|---|
| 501,973 | Umbenhauer | July 25, 1893 |
| 1,070,049 | Machava | Aug. 12, 1913 |
| 1,430,226 | Goodreau | Sept. 26, 1922 |